US006799636B2

(12) United States Patent
Funkhouser et al.

(10) Patent No.: US 6,799,636 B2
(45) Date of Patent: Oct. 5, 2004

(54) METHODS AND COMPOSITIONS FOR CEMENTING IN WELLBORES

(75) Inventors: Gary P. Funkhouser, Duncan, OK (US); Larry S. Eoff, Duncan, OK (US); Lewis R. Norman, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 116 days.

(21) Appl. No.: 10/231,971

(22) Filed: Aug. 30, 2002

(65) Prior Publication Data

US 2004/0040714 A1 Mar. 4, 2004

(51) Int. Cl.$^7$ ............................................. E21B 33/138
(52) U.S. Cl. ........................ 166/293; 166/285; 166/300
(58) Field of Search .......................... 166/285, 292–294, 166/300, 305.1

(56) References Cited

U.S. PATENT DOCUMENTS

| | | | | |
|---|---|---|---|---|
| 4,234,344 A | | 11/1980 | Tinsley et al. ................. | 106/88 |
| 4,484,949 A | * | 11/1984 | Potter et al. ................. | 106/798 |
| 5,335,726 A | | 8/1994 | Rodrigues ................... | 166/295 |
| 6,043,296 A | * | 3/2000 | Davies et al. ............... | 523/116 |
| 6,143,069 A | * | 11/2000 | Brothers et al. ............ | 106/678 |
| 6,367,549 B1 | | 4/2002 | Chatterji et al. ............ | 166/292 |

FOREIGN PATENT DOCUMENTS

| EP | 967956 A1 | * | 1/2000 | ............ A61K/6/06 |
|---|---|---|---|---|

OTHER PUBLICATIONS

Halliburton brochure entitled "Spherelite Cement Additive" dated 1999.
Halliburton brochure entitled "Hi–Dense® Weight Additives" dated 1998.
Article entitled "Influence of poly (acrylic acid) molar mass on the fracture properties of glass polyalkenoate cements based on waste gasifier slags", by A. Sullivan et al., Journal of Materials Science, pp. 1125–1134, 2000.
Article entitled "A preliminary investigation of glass polyalkenoate cements based on waste gasifier slags" by A. Sullivan et al., Journal of Materials Science Letters, pp. 323–325, 2000.
Article entitled "Cementitious Properties of Slags from the British Gas/Lurgi Slagging Gasifier" by P.J. Nixon et al., Silicates Industriels, pp. 253–262, 1983.
Article entitled "Glass–ionomer dental restoratives" by Bill M. Culbertson, Progress in Polymer Science, paged 577–604, 2001.
3M brochure entitled "Speciality Materials For the Oil & Gas Industry", undated.

* cited by examiner

Primary Examiner—Zakiya Walker
(74) Attorney, Agent, or Firm—Craig W. Roddy; Baker Botts, L.L.P.

(57) ABSTRACT

Methods of cementing in wellbores using cement compositions having elasticity or high compressive strength and low permeability are provided. The cement compositions are basically comprised of particulate acid degradable glass, water, at least one water soluble polymerizable alkenoic acid monomer and a water soluble free-radical initiator.

33 Claims, No Drawings

METHODS AND COMPOSITIONS FOR CEMENTING IN WELLBORES

BACKGROUND OF THE INVENTION

1. Field of the Invention

The present invention relates generally to methods and compositions for cementing in wellbores.

2. Description of the Prior Art

Hydraulic cement compositions are commonly utilized in subterranean well completion and remedial operations. For example, hydraulic cement compositions are used in primary cementing operations whereby pipe strings such as casings and liners are cemented in wellbores. In performing primary cementing, a hydraulic cement composition is pumped into the annular space between the walls of a wellbore and the exterior surfaces of a pipe string disposed therein. The cement composition is permitted to set in the annular space thereby forming an annular sheath of hard substantially impermeable cement therein. The cement sheath physically supports and positions the pipe string in the wellbore and bonds the exterior surfaces of the pipe string to the walls of the wellbore whereby the undesirable migration of fluids between zones or formations penetrated by the wellbore is prevented.

Multi-lateral wells have been developed which include vertical or deviated principal wellbores having one or more ancillary laterally extending wellbores connected thereto. Drilling and completion equipment is available which allows multiple-laterals to be drilled from a principal cased and cemented wellbore. Each of the lateral wellbores can include a liner cemented therein which is tied into the principal wellbore.

While conventional hydraulic cement compositions which are basically comprised of a hydraulic cement, e.g., Portland cement, water, and various conventional cement additives have been used successfully in primary cementing and other well cementing applications, in some well cementing applications a cement composition is required that upon setting has a higher compressive strength and lower permeability than conventional hydraulic cement compositions. Examples of well cement applications which require very high strength and very low permeability cement include, but are not limited to, cemented multi-lateral junctions, kick-off or whip-stock plugs which are placed in a wellbore to deflect the drill bit of a drill string and start directional drilling, cement plugs set on top of mechanical bridge plugs used to shut-off lower zones, plugs set in wellbores to seal the wellbores when the wells are abandoned and in remedial applications such as squeeze cementing where a cement is pressured into cracks, holes or other openings in casings or liners, cement sheaths sealing the liners in the wellbore and the like.

Thus, there are needs for improved cement compositions for use in wellbores which have very high compressive strengths and very low permeabilities.

SUMMARY OF THE INVENTION

The present invention provides improved methods and compositions for cementing in wellbores. A method of the invention for cementing in a subterranean zone penetrated by a wellbore is basically comprised of the following steps. A cement composition is provided comprised of a particulate acid degradable glass, sufficient water to form a slurry and a water soluble polyalkenoic acid. The cement composition is placed in the subterranean zone by way of the wellbore after which the cement composition is allowed to set into a strong impermeable solid cement mass in the subterranean zone.

Another method of the invention is basically comprised of the following steps. A cement composition is provided comprised of particulate acid degradable glass, sufficient water to form a slurry, at least one water soluble polymerizable alkenoic acid monomer and a water soluble free-radical initiator. The cement composition is placed in the subterranean zone by way of the wellbore after which the cement composition is allowed to set into a strong impermeable solid cement mass in the subterranean zone. The cement composition sets as a result of the free-radical polymerization initiator causing the alkenoic acid monomer to polymerize and react with the acid degradable glass.

A well cement composition of this invention is basically comprised of particulate acid degradable glass, sufficient water to form a slurry, at least one water soluble polymerizable alkenoic acid monomer and a water soluble free-radical initiator.

The objects, features and advantages of the present invention will be readily apparent to those skilled in the art upon a reading of the description of preferred embodiments which follows.

DESCRIPTION OF PREFERRED EMBODIMENTS

The present invention provides improved methods and compositions for cementing in subterranean zones penetrated by wellbores. The cement compositions can be elastic or they can have very high compressive strength and very low permeability. The methods and cement compositions of this invention are useful in a variety of well cementing applications such as cementing multi-lateral junctions, forming kick-off or whip-stock plugs in wellbores to deflect drill bits and start directional drilling, cementing bridge plugs in wellbores to shut off lower zones, cementing wellbores to form plugs therein when the wellbores are abandoned and remedial applications in wellbores whereby holes, cracks and the like in casing and cement are repaired by squeeze cementing techniques. A quick setting cement composition which can be utilized in accordance with the methods of this invention is basically comprised of particulate acid degradable glass, sufficient water to form a slurry and a water soluble polyalkenoic acid. The polyalkenoic acid reacts with the particulate acid degradable glass and relatively quickly sets and forms a strong impermeable solid cement.

An improved cement composition of this invention which can be utilized in applications in which the set of the cement composition must be delayed to allow its placement in a subterranean zone is basically comprised of a particulate acid degradable glass, sufficient water to form a slurry, at least one water soluble polymerizable alkenoic acid monomer and a water soluble free-radical polymerization initiator.

The particulate acid degradable glass is different from well-known soda-lime glass. Acid degradable glass is a calcium alumino silicate material which is a commercially available glass that is mixed with fluoride and utilized in dental applications. The fluoride in the acid degradable glass used by dentists is for preventing tooth decay and is not necessary in well applications. Calcium alumino silicate glass is also available as a slag by-product from coal gasification processes. As the name implies, acid degradable glass is degraded by and reacts with certain acids when in contact therewith. The acid degradable glass is present in the cement compositions described above in an amount in the range of from about 2.5% to about 85% by weight of the composition.

The water in the cement compositions of this invention can be fresh water or saltwater. The term "saltwater" is used herein to mean unsaturated salt solutions and saturated salt solutions including brines and seawater. The water is present in the cement compositions in an amount in the range of from about 10% to about 40% by weight of the compositions.

The water soluble polyalkenoic acids which can be utilized in the quick setting cement compositions described above include, but are not limited to, homopolymers or copolymers of acrylic acid, methacrylic acid, itaconic acid, maleic acid, and butene-1,2,3-tricarboxylic acid. Of these, polyacrylic acid or polymethacrylic acid is preferred. The polyalkenoic acid is present in the cement compositions in an amount in the range of from about 5% to about 15% by weight of the compositions.

The water soluble polymerizable alkenoic acid monomer or monomers in the delayed set compositions of this invention can be alkenoic acid monomers selected from the group consisting of acrylic acid, itaconic acid, maleic acid, methacrylic acid, 3-butene-1,2,3-tricarboxylic acid and mixtures thereof. Of these, acrylic acid or methacrylic acid is preferred. The one or more water soluble ailcenoic acid monomers can be alkenoic acid esters which are delayed by requiring hydrolysis before polymerizing and reacting with the acid degradable glass. Examples of the alkenoic acid esters which can be utilized include, but are not limited to, hydroxyethyl acrylate ester, hydroxyethyl methacrylate ester, hydroxypropyl acrylate ester, hydroxypropyl methacrylate ester and mixtures thereof. Of these, hydroxyethyl acrylate ester is preferred. The one or more water soluble polymerizable alkenoic acid monomers or esters utilized are included in the cement compositions of this invention in an amount in the range of from about 5% to about 15% by weight of the compositions.

A variety of water-soluble free-radical polymerization initiators can be utilized in the delayed set compositions. A particularly suitable type of free-radical initiator is an azo polymerization initiator. Azo polymerization initiators are defined by the formulas set forth in detail in U.S. Pat. No. 5,335,726 issued to Rodrigues on Aug. 9, 1994 which is incorporated herein by reference thereto. The azo polymerization initiators are commercially available from Wako Pure Chemical Industries, Ltd. of Osaka, Japan and Wako Chemicals USA, Inc. of Richmond, Va. The azo initiators have 10 hour half-lives at temperatures ranging from about 110° F. to about 220° F. Accordingly, by determining the temperature of the formation into which the cement composition of this invention is to be placed and the required pumping time, an azo initiator type and concentration can be selected for polymerization initiation which provides an induction period sufficient to allow the cement to be placed.

Particularly suitable azo free radical initiators include, but are not limited to, 1-[(1-cyano-1-methylethyl)azo] formamide (10 hour half life temperature 219° F.), 2,2'-azobis[2-(5-methyl-2-imidazolin-2-yl)propane] dihydrochloride (10 hour half life temperature 106° F.), 2,2'-azobis (2-methylpropionamidine) dihydrochloride (10 hour half life temperature 133° F.), 2,2'-azobis[2-(2-imidazolin-2-yl) propane] dihydrochloride (10 hour half life temperature 111° F.), 2,2'-azobis[2-methyl-N-(2-hydroxy-ethyl) propionamide] (10 hour half life temperature 187° F.) and 4,4'-azobis(4-cyanovaleric acid) (10 hour half life temperature 156° F.).

When an alkenoic acid or a delayed alkenoic acid ester is utilized in the cement compositions, the water-soluble free-radical initiator can be an oxidizing compound. Examples of such oxidizing free-radical initiators include, but are not limited to, sodium persulfate, ammonium persulfate, t-butylhydroperoxide and hydrogen peroxide with or without a reducing agent selected from the group consisting of sodium thiosulfate, sodium bisulfite and triethanolamine.

Generally, the water soluble free-radical initiator utilized is present in the cement compositions in an amount in the range of from about 0.001% to about 0.25% by weight of the compositions.

The quick set and delayed set cement compositions can also include a filler comprised of silica flour or powdered iron oxide. When used, the filler is present in the cement compositions in an amount in the range of from about 10% to about 1900% by weight of the acid degradable glass therein. The presence of relatively large amounts of filler in the cement compositions makes the cement compositions elastic. For example, when a cement composition of this invention includes a ratio of iron oxide filler to acid degradable glass in the range of from about 3:1 to about 19:1, the resulting set cement composition has elastic properties.

The methods of this invention for cementing in a subterranean zone penetrated by a wellbore are basically comprised of the following steps. A cement composition is provided comprised of particulate acid degradable glass, sufficient water to form a slurry, and a polyalkenoic acid, or alternatively when it is necessary to delay the set of the cement composition, at least one water soluble polymerizable alkenoic acid monomer and a water soluble free-radical initiator. The cement composition is placed in a subterranean zone to be cemented and then allowed to set into a strong impermeable solid cement mass in the subterranean zone.

The mechanism by which the delayed set cement compositions of this invention set is as follows. The free-radical polymerization initiator causes the one or more alkenoic acid monomers to polymerize. The resulting alkenoic acid polymer then reacts with the acid degradable glass to form a strong impermeable solid cement mass. While the alkenoic acid monomer or monomers may react with the acid degradable glass prior to the polymerization, that reaction does not cause a set.

A preferred method of this invention for cementing in a subterranean zone penetrated by a wellbore where a quick set is required comprises the steps of: (a) providing a cement composition comprised of particulate acid degradable glass, sufficient water to form a slurry and a water soluble polyalkenoic acid; (b) placing the cement composition in the subterranean zone; and (c) allowing the polyalkenoic acid to react with the acid degradable glass and set into a strong impermeable solid cement mass in the zone.

Another preferred method of the present invention for cementing in a subterranean zone penetrated by a wellbore where a delayed set is required comprises the steps of: (a) providing a cement composition comprised of particulate acid degradable glass, sufficient water to form a slurry, at least one water soluble polymerizable alkenoic acid monomer and a water soluble free-radical initiator; (b) placing the cement composition in the subterranean zone; and (c) allowing the free-radical initiator to cause the alkenoic acid monomer to polymerize and react with the acid degradable glass and set into a strong impermeable solid cement mass in the zone.

A preferred well cement composition of this invention is comprised of particulate acid degradable glass, sufficient water to form a slurry, at least one water soluble polymerizable alkenoic acid monomer and a water soluble free-radical initiator.

In order to further illustrate the methods and compositions of this invention the following example is given.

EXAMPLE 1

A cement composition was prepared by combining a 30% by weight water solution of a copolymer of acrylic acid and itaconic acid having a weight ratio of acrylic acid to itaconic acid of 7:3 with particulate acid degradable glass. The particulate acid degradable glass was combined with the copolymer solution in a weight ratio of copolymer solution to particulate acid degradable glass of 1:1. The resulting composition was cured for 24 hours at 73° F. after which the composition was tested for compressive strength. The test result was that the composition had a compressive strength of 2912 psi.

EXAMPLE 2

A first cement composition of this invention was prepared by dissolving a methacrylic acid monomer in water in an amount to produce an aqueous solution containing 30% by weight methacrylic acid. An azo initiator, i.e., 2,2'-azobis (2-methylpropionamidine) dihydrochloride was added to the monomer solution in an amount equivalent to 40 pounds of initiator per 1,000 gallons of the monomer solution. Particulate acid degradable glass was added to the monomer solution in a weight ratio of aqueous solution to particulate acid degradable glass of 1:1. A second cement composition was prepared which was identical to the first cement composition except that a 1:1 mixture of silica flour and acid degradable glass was used in place of the acid degradable glass. The resulting cement compositions were cured for 18 hours at 140° F. after which the set cement compositions were tested for compressive strength. The compressive strength of the first cement composition which did not contain silica flour was 5,343 psi and the compressive strength of the second cement composition containing silica flour was 4,978 psi.

EXAMPLE 3

A first cement composition of this invention was prepared by dissolving acrylic acid monomer in water in an amount to produce an aqueous solution containing 30% by weight acrylic acid. A 2,2'-azobis(2-methylpropionamidine) dihydrochloride initiator was added to the monomer solution in an amount equivalent to 40 pounds of initiator per 1,000 gallons of the monomer solution. Particulate acid degradable glass was added to the monomer solution in a weight ratio of aqueous solution to particulate acid degradable glass of 1:1. A second cement composition was prepared which was identical to the first cement composition except that a 1:1 mixture of silica flour and acid degradable glass was used in place of the acid degradable glass. A third cement composition was prepared which was identical to the first cement composition except that a 1:1 mixture of powdered iron oxides and acid degradable glass was used in place of the acid degradable glass. The resulting cement compositions were cured for 18 hours at 140° F. after which the set cement compositions were tested for compressive strength. The compressive strength of the first cement composition which did not contain silica flour or powdered iron oxide was 2,100 psi. The compressive strength of the second cement composition which contained silica flour was 3,170 psi and the compressive strength of the third cement composition which contained powdered iron oxide was 2,920 psi.

EXAMPLE 4

A cement composition was prepared by dissolving acrylic acid in a 0.4% aqueous solution of xanthan gum to produce an aqueous solution containing 30% acrylic acid. 2,2'-azobis (2-methylpropionamidine) dihydrochloride initiator was added to the monomer solution in an amount equivalent to 0.1% w/v. A 95:5 mixture of powdered iron oxides and acid degradable glass was added to the monomer solution in a weight ratio of aqueous solution to solids of 1:1. The resulting cement composition was cured at 140° F. for 72 hours. The cement was compressed in a load cell to 24% of its original length without failing (730 psi maximum stress based on the original cross-sectional area). Within 1 hour of removing the sample from the load cell, it had recovered 99% of its original length, demonstrating the elastic characteristic of the cement.

Thus, the present invention is well adapted to carry out the objects and attain the ends and advantages mentioned as well as those which are inherent therein. While numerous changes may be made by those skilled in the art, such changes are encompassed within the spirit of this invention as defined by the appended claims.

What is claimed is:

1. A method of cementing in a subterranean zone penetrated by a well bore comprising the steps of: (a) providing a cement composition comprised of particulate acid degradable glass, sufficient water to form a slurry and a water soluble polyalkenoic acid; (b) placing said cement composition in said subterranean zone; and (c) allowing said polyalkenoic acid to react with said acid degradable glass to form a cement mass in said zone.

2. The method of claim 1 wherein said particulate acid degradable glass is present in an amount in the range of from about 2.5% to about 85% by weight of said composition.

3. The method of claim 1 wherein said water is selected from the group of fresh water and salt water.

4. The method of claim 1 wherein said water is present in an amount in the range of from about 10% to about 40% by weight of said composition.

5. The method of claim 1 wherein said water soluble polyalkenoic acid is selected from the group consisting of homopolymers and copolymers of acrylic acid, methacrylic acid, itaconic acid, maleic acid, and 3-butene-1,2,3-tricarboxylic acid.

6. The method of claim 1 wherein said water soluble polyalkenoic acid is polyacrylic acid or polymethacrylic acid.

7. The method of claim 1 wherein said water soluble polyalkenoic acid is present in an amount in the range of from about 5% to about 15% by weight of said composition.

8. The method of claim 1 wherein said cement composition further comprises a filler selected from the group consisting of silica flour and powdered iron oxide.

9. The method of claim 8 wherein said filler is present in an amount in the range of from about 10% to about 1900% by weight of said acid degradable glass in said composition.

10. A method of cementing in a subterranean zone penetrated by a well bore comprising the steps of: (a) providing a cement composition comprised of particulate acid degradable glass, sufficient water to form a slurry, at least one water soluble polymerizable alkenoic acid monomer and a water soluble free-radical initiator; (b) placing said cement composition in said subterranean zone; and (c) allowing said free-radical initiator to cause said alkenoic acid monomer to polymerize and react with said acid degradable glass to form a cement mass in said zone.

11. The method of claim 10 wherein said particulate acid degradable glass present in an amount in the range of from about 2.5% to about 85% by weight of said composition.

12. The method of claim 10 wherein said water is selected from the group of fresh water and salt water.

13. The method of claim 10 wherein said water is present in an amount in the range of from about 10% to about 40% by weight of said composition.

14. The method of claim 10 wherein said water soluble polymerizable alkenoic acid monomer is selected from the group consisting of acrylic acid, itaconic acid, maleic acid, methacrylic acid, 3-butene-1,2,3-tricarboxylic acid and mixtures thereof.

15. The method of claim 10 wherein said water-soluble polymerizable alkenoic acid monomer is acrylic acid or methacrylic acid.

16. The method of claim 10 wherein said water soluble polymerizable alkenoic acid monomer is an alkenoic acid ester which is delayed by requiring hydrolysis before reacting with said acid degradable glass.

17. The method of claim 16 wherein said alkenoic acid ester is selected from the group consisting of hydroxyethyl acrylate ester, hydroxyethyl methacrylate ester, hydroxypropyl acrylate ester, hydroxypropyl methacrylate ester and mixtures thereof.

18. The method of claim 16 wherein said ailcenoic acid ester is hydroxyethyl acrylate ester.

19. The method of claim 10 wherein said water soluble polymerizable alkenoic acid monomer or ester is present in an amount in the range of from about 5% to about 15% by weight of said composition.

20. The method of claim 10 wherein said water soluble free-radical initiator is a temperature activated azo initiator selected from the group consisting of 1-[(1-cyano-1-methylethyl)azo]formamide, 2,2'-azobis[2-(5-methyl-2-imidazolin-2-yl)propane]dihydro-chloride, 2,2'-azobis(2-methylpropionamidine) dihydrochloride, 2,2'-azobis[2-(2-imidazolin-2-yl)propane] dihydrochloride, 2,2'-azobis[2-methyl-N-(2-hydroxyethyl)propionamide] and 4,4'-azobis (4-cyanovaleric acid).

21. The method of claim 10 wherein said water soluble free-radical initiator is selected from the group consisting of sodium persulfate, ammonium persulfate, t-butyl hyperoxide and hydrogen peroxide with or without a reducing agent selected from the group consisting of sodium thiosulfate, sodium bisulfite and triethanolamine.

22. The method of claim 10 wherein said water soluble free-radical initiator is present in an amount in the range of from about 0.0001% to about 0.25% by weight of said composition.

23. The method of claim 10 wherein said cement composition further comprises a filler selected from the group consisting of silica flour and powdered iron oxide.

24. The method of claim 23 wherein said filler is present in an amount in the range of from about 10% to about 1900% by weight of said acid degradable glass in said composition.

25. A method of cementing in a subterranean zone comprising the steps of: (a) providing a cement composition comprising an acid degradable glass; (b) placing said composition in said subterranean zone; and (c) allowing said composition to solidify.

26. The method of claim 25 wherein said acid degradable glass is present in an amount in the range of from about 2.5% to about 85% by weight of said composition.

27. The method of claim 25 wherein said composition comprises water selected from the group of fresh water and salt water.

28. The method of claim 25 wherein said composition comprises water present in an amount in the range of from about 10% to about 40% by weight of said composition.

29. The method of claim 25 wherein said composition comprises a water soluble polyalkenoic acid selected from the group consisting of homopolymers and copolymers of acrylic acid, methacrylic acid, itaconic acid, maleic acid, and 3-butene-1,2,3-tricarboxylic acid.

30. The method of claim 25 wherein said composition comprises polyacrylic acid or polymethacrylic acid.

31. The method of claim 25 wherein said composition comprises a water soluble polyalkenoic acid present in an amount in the range of from about 5% to about 15% by weight of said composition.

32. The method of claim 25 wherein said composition further comprises a filler selected from the group consisting of silica flour and powdered iron oxide.

33. The method of claim 32 wherein said filler is present in an amount in the range of from about 10% to about 1900% by weight of said acid degradable glass in said composition.

* * * * *